Nov. 8, 1938.  T. G. DE VILBISS  2,136,279
FLOWERPOT HOLDER
Filed May 22, 1936  2 Sheets-Sheet 1

Thomas G. De Vilbiss, INVENTOR
BY Victor J. Evans & Co.
ATTORNEYS

Nov. 8, 1938.  T. G. DE VILBISS  2,136,279
FLOWERPOT HOLDER
Filed May 22, 1936   2 Sheets-Sheet 2
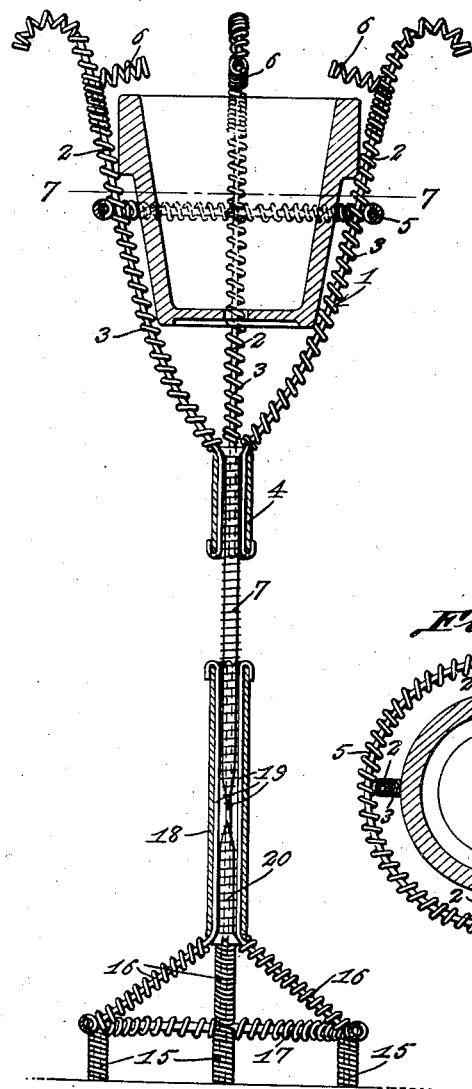
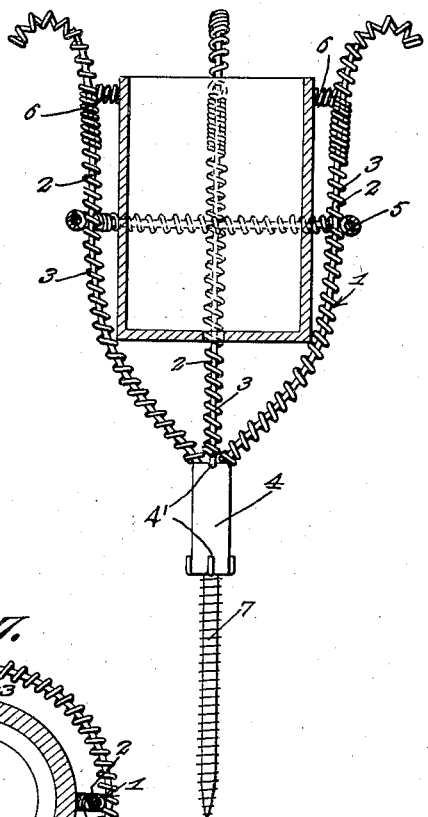
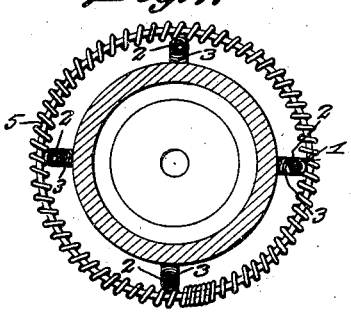

Patented Nov. 8, 1938

2,136,279

UNITED STATES PATENT OFFICE 2,136,279

FLOWERPOT HOLDER

Thomas G. De Vilbiss, San Antonio, Tex.

Application May 22, 1936, Serial No. 81,315

3 Claims. (Cl. 248—153)

This invention relates to holders, primarily designed for flower pots and the like, and its general object is to provide a holder as well as supporting means therefor, that is made essentially from wire which includes a pair of strands, one strand providing a core and the other wound or wrapped about the core strand in coiled formation, so that the strands in effect reinforce each other, and produce a double strand wire that is not only strong and sturdy but can be easily used or worked in making articles, such as flower pot holders and stands and brackets therefor that possess considerable ornamentality, due to the appearance presented by the coiled strand, and the manner in which the wire is bent.

A further object of the invention is to provide a flower pot holder that is readily adjustable to fit pots of various sizes, and is capable of setting up a clamping action against the pot to prevent casual displacement thereof.

Another object of the invention is to provide a flower pot holder that includes supporting means therefor in the form of a stand and bracket, with the flower pot receiving means or holder being adjustable with respect to the supporting means and removable therefrom, and the receiving means includes means for fixing the same to the stand or bracket, as well as other supporting means, such as a post or the like, or even to the ground.

A still further object of the invention is to provide a device of the character set forth, that is simple in construction, inexpensive to manufacture, and extremely efficient in use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 5 is a view partly in section showing the holder supported by a stand.

Figure 6 is a view of the holder.

Figure 7 is a sectional view taken approximately on line 7—7 of Figure 5.

Figure 1:
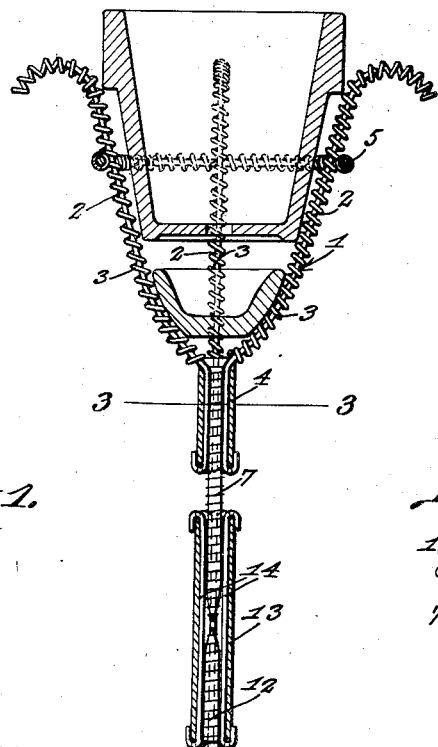
Figure 1 is a side elevation illustrating the pot holder received and supported by a bracket which forms a part of my invention.
Figure 3:
Figure 3 is a sectional view taken approximately on line 3—3 of Figure 1.
Figure 4:
Figure 4 is a detail view showing the structure of the wire used in the construction of the holder and the supporting means therefor.
Figure 2:
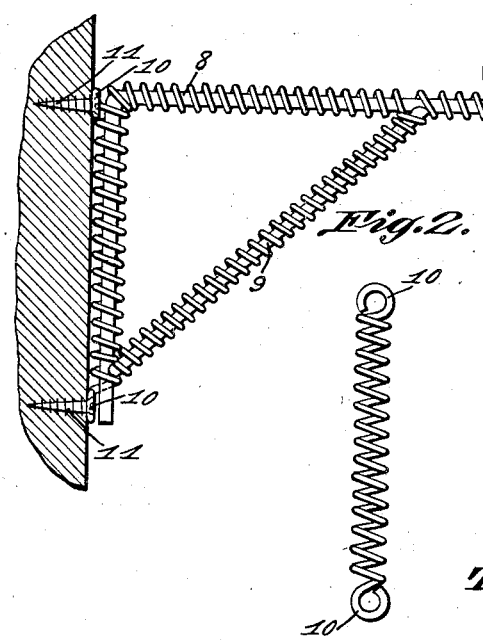
Figure 2 is a detail view of the bracket securing means.

Referring to the drawings in detail, it will be noted that the holder which is best shown in Figure 6 includes arms 1 which are made from the double strand wire that includes a core strand 2 and a coil strand 3, the latter being wrapped about the core strand as shown, and the arms are disposed in cooperative association to provide a body or receptacle portion of the holder. In the form as shown, the arms have lower end portions which are free from the coil strand extending through a sleeve 4 that is provided with notched upper and lower ends 4', with the core strands received therein to hold them in equi-distantly spaced relation with respect to each other, and the lower ends of the strands 3 are bent upwardly to contact the outer side of the sleeve.

The portions of the core strands exteriorly of the sleeve have the coil strands thereon, and the arms are outwardly flared from their connection with the sleeve, thence are directed at a slight outward inclination and terminate at their upper ends in outwardly curved portions.

Cooperating with the arms 1 to provide the body or receptacle, is a ring 5 which in the form as shown, likewise includes a core strand and a coil strand, and the ring is slidably mounted on the arms 1, to hold them in adjusted positions with respect to each other, as well as in clamping association with a pot as shown. I likewise provide springs 6 formed by pieces of the coil strand and a portion of the pieces are wrapped about the arms with the remaining portions extending at right angles thereto for disposal above the pot or in contacting engagement with the side thereof, as shown in Figures 5 and 6. It will be obvious from Figure 1 that the springs 6 can be eliminated, especially where unusual large pots are used in the holder, but the springs 6 do act to hold small pots within the holder, and as shown in Figure 6 prevent casual displacement thereof.

Threaded through the sleeve 4 is a headed screw 7, and this screw not only acts to hold the strands properly spaced within the sleeve, and cooperates with the notches for that purpose, but likewise acts as a securing means for the holder whether it be to the bracket as shown in Figure 1, the stand as shown in Figure 5, or to a fence post or the like supporting means, as it will be obvious that the screw can be threaded into the post or the like, by a screw driver through the medium of its kerfed head, as ready access may be had to the head, as clearly shown in Figure 5.

The bracket as shown in Figure 1 includes a right angle arm 8 and a brace arm 9 secured to and bridging the right angle portions of the arm 8. These arms 8 and 9 likewise include a core strand which is of relatively heavy wire such as a rod, and they are wrapped by coil strands, as shown. The coil strand for the vertical portion, of the arm 8 terminates in eyes 10 which receive screws or the like 11 whereby the bracket can be fixed to suitable supporting means, as shown.

The horizontal portion of the arm 8 terminates at its outer end into a vertical portion 12 which is not only screw threaded, but terminates in a tapered pointed end, as shown.

A sleeve 13 is mounted on the vertical portion 12 and has strands 14 extending therethrough with their outer ends bent about the ends of the sleeve as shown, and this sleeve may have notches in the ends thereof to receive the strands 14.

The holder is supported by the bracket and for that purpose the headed screw 7 is received in the sleeve 13, in a manner whereby the threads of the screw 7 is disposed in biting engagement with the strands 14, consequently it will be seen that the holder can be adjusted vertically with respect to the bracket, and the same is true with respect to the threads of the vertical portion 12.

In Figure 5 I have illustrated a stand for supporting the holder and which includes a base that is likewise made up of my wire, in that it includes core strands and coil strands, and the wire is shaped to provide feet 15 extending vertically and extending inwardly from the feet are legs 16. The feet and legs are reinforced by a ring 17 which is secured at the juncture thereof as shown, and disposed about the outer side, in the form shown. A relatively long sleeve 18 is included in the stand structure and has the portions 19 of the core strands extending therethrough, with their upper ends bent about the upper end of the sleeve for securing the sleeve in place, and the lower end of the sleeve is supported at the juncture of the portions 19 with the legs 16. The portions 19 are held rigidly within the sleeve 18 by a screw 20, and also by the screw 7 of the holder, the screw being mounted in the sleeve 18 in the same manner as within the sleeve 13.

From the above description and disclosure of the drawings, it will be obvious that I have provided a flower pot holder and supporting means therefor, in the form of a wall bracket and floor stand, and while I have illustrated one shape of the structure of these elements, I want it understood that they can be made in various shapes from the wire as shown, without departing from the spirit of the invention, and of course, any type of pot can be employed within the body of the holder, as well as drip receptacles, one of which is shown in Figure 1.

The core strand of my wire is preferably inelastic, while the coil strand has a certain amount of inherent resiliency therein, and is relatively stiffer than the core strand.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A receptacle holder comprising a plurality of arms, each including a strand of wire having a second strand coiled thereabout and extending from one end thereof for the major portion of its length, a sleeve having the portions of the arms that are free from the coiled strands mounted therein and disposed therethrough, with the arms radiating upwardly from the sleeve at an outward inclination, means surrounding the outer portions of the arms for holding them associated to provide a receptacle receiving portion, said sleeve having notched ends, with the arms mounted in the notches thereof, a screw extending through the sleeve and cooperating with the notches for fixing the arms to the sleeve, and means having the screw adjustably secured therein for supporting the receptacle receiving portion in an upright position.

2. A receptacle holder comprising a plurality of arms, each including a strand of wire having a second strand coiled thereabout and extending from one end thereof for the major portion of its length, a sleeve having the portions of the arms that are free from the coiled strands mounted therein and disposed therethrough, with the arms radiating upwardly from the sleeve at an outward inclination, means surrounding the outer portions of the arms for holding them associated to provide a receptacle receiving portion, said sleeve having notched ends, with the arms mounted in the notches thereof, a screw extending through the sleeve and cooperating with the notches for fixing the arms to the sleeve, a stand including inner and outer strands of wire shaped to provide legs and feet and with the outer strands coiled about the inner strands, and a sleeve secured to and rising from the legs and having the screw mounted therein for adjustably supporting the receptacle receiving portion in an upright position.

3. A receptacle holder comprising a plurality of arms, each including a strand of wire having a second strand coiled thereabout and extending from one end thereof for the major portion of its length, a sleeve having the portions of the arms that are free from the coiled strands mounted therein and disposed therethrough, with the arms radiating upwardly from the sleeve at an outward inclination, means surrounding the outer portions of the arms for holding them associated to provide a receptacle receiving portion, said sleeve having notched ends, with the arms mounted in the notches thereof, a screw extending through the sleeve and cooperating with the notches for fixing the arms to the sleeve, a bracket including inner and outer strands of wire shaped to provide a right angle arm and a brace arm bridging the right angle portions thereof, said outer strands being coiled about the inner strands, and a sleeve secured to and rising from the right angle arm and having the screw mounted therein for adjustably supporting the receptacle receiving portion in an upright position.

THOMAS G. DE VILBISS.